(12) United States Patent
Bodtker et al.

(10) Patent No.: US 6,482,119 B2
(45) Date of Patent: Nov. 19, 2002

(54) LOW NOISE PLANETARY ISOLATOR

(75) Inventors: Joen Christen Bodtker, Flint, MI (US); George E. Arlt, Midland, MI (US)

(73) Assignee: Delphi Technologies, Inc., Troy, MI (US)

(*) Notice: Subject to any disclaimer, the term of this patent is extended or adjusted under 35 U.S.C. 154(b) by 40 days.

(21) Appl. No.: 09/820,480

(22) Filed: Mar. 29, 2001

(65) Prior Publication Data

US 2002/0142881 A1 Oct. 3, 2002

(51) Int. Cl.$^7$ ............................................. F16H 57/08
(52) U.S. Cl. ............................................ 475/331; 74/443
(58) Field of Search ........................ 475/331; 74/443, 74/446; 267/136, 137

(56) References Cited

U.S. PATENT DOCUMENTS

| | | | | |
|---|---|---|---|---|
| 4,148,354 A | * | 4/1979 | Rao ............................ 165/10 |
| 4,269,262 A | * | 5/1981 | Knapp et al. ................ 156/289 |
| 4,912,998 A | * | 4/1990 | Sugano et al. ............... 74/409 |
| 5,400,672 A | * | 3/1995 | Bunch, Jr. .................... 74/409 |
| 5,415,063 A | * | 5/1995 | Honlinger et al. .......... 181/207 |
| 5,452,622 A | * | 9/1995 | Fenelon ...................... 264/242 |
| 5,557,980 A | * | 9/1996 | Mastroianni et al. ...... 192/54.3 |
| 5,927,149 A | * | 7/1999 | Moody ........................ 464/89 |
| 6,129,648 A | * | 10/2000 | Tanioka et al. ............. 475/331 |
| 6,346,061 B1 | * | 2/2002 | Olsson ...................... 280/250.1 |

FOREIGN PATENT DOCUMENTS

JP 3129157 * 3/1991 ................. 74/443

* cited by examiner

*Primary Examiner*—Christopher P. Schwartz
*Assistant Examiner*—Devon Kramer
(74) *Attorney, Agent, or Firm*—Edmund P. Anderson

(57) ABSTRACT

A planet gear includes a toothed portion having an axial bore, a hub disposed within the axial bore such that a space is defined between the hub and the toothed portion, and an elastomeric isolator disposed in the space. A gear is quieter in operation through configuration such that the gear includes a toothed portion having an axial bore and a hub coaxially orientable within the axial bore, and an elastomeric isolator is positioned between the hub and the toothed portion.

25 Claims, 5 Drawing Sheets

LOW NOISE PLANETARY ISOLATOR

TECHNICAL FIELD

This disclosure relates to planetary gear systems, and, more particularly, to a planet gear having a damping element (elastomeric isolator) that reduces energy (vibration and noise) propagation during the operation of a planetary gear system into which the planet gear is incorporated.

BACKGROUND

Planetary gear systems typically comprise a plurality of drivable or idler gears (e.g., planet gears) engaged by a pinion (e.g., a sun gear). Because they share a single load between several meshes of gears, planetary gear systems are generally more compact than parallel shaft drives and offer significant space savings. Planetary gear systems do, however, produce audible noise that may be a detractor in some applications.

The problem of audible noise is exacerbated as a result of two conditions that exist within known planetary gear systems. The first condition is a function of the material of fabrication of the gears. Typically, at least one of the gears is fabricated from metal. Metal gears provide a harsher impact of the surfaces of the gear teeth when the gears mesh during the operation of the system. Such a reduced compliant impact increases the amount of noise generated. The second condition is a function of the damping aspects of the system. Elastomeric O-rings may be disposed between an inside surface of a bored planet gear tooth portion and an outside surface of a hub to minimize the transfer of gear mesh energy (vibration) from the teeth of the gear to the hub and isolate the vibration from the remainder of the system, thereby reducing audible noise. Conventional elastomeric O-rings, however, have a radial stiffness that is too high to isolate all of the gear mesh energy from propagating to other parts of the gear system when the planet gear tooth portion compresses the O-rings against the hub after assembling a planet gear. Therefore, an isolator with a design that retains an effective spring rate to isolate gear mesh energy is needed that is cost effective when assembling a planet gear in which an elastomeric isolator is compressed between the inside surface of an axially bored planet gear and the outside surface of a hub.

SUMMARY

An elastomeric isolator for use with a planet gear in a planetary gear system is disposed between the structural components of the planet gear. The planet gear includes a toothed portion having an axial bore, a hub coaxially orientable within the axial bore such that a space is defined between the hub and the toothed portion, and an elastomeric isolator disposed therebetween. The elastomeric isolator is configured having a ring having a first dimension interconnecting a plurality of spheroids having a second dimension for retaining the spring rate of the ring. The configuration of the elastomeric isolator, in conjunction with the architecture of the planet gear, provides for a radial spring rate and a radial damping ability that effectively minimizes the amount of gear mesh energy transferred to other elements of the planetary gear system.

DETAILED DESCRIPTION

Figure 1:
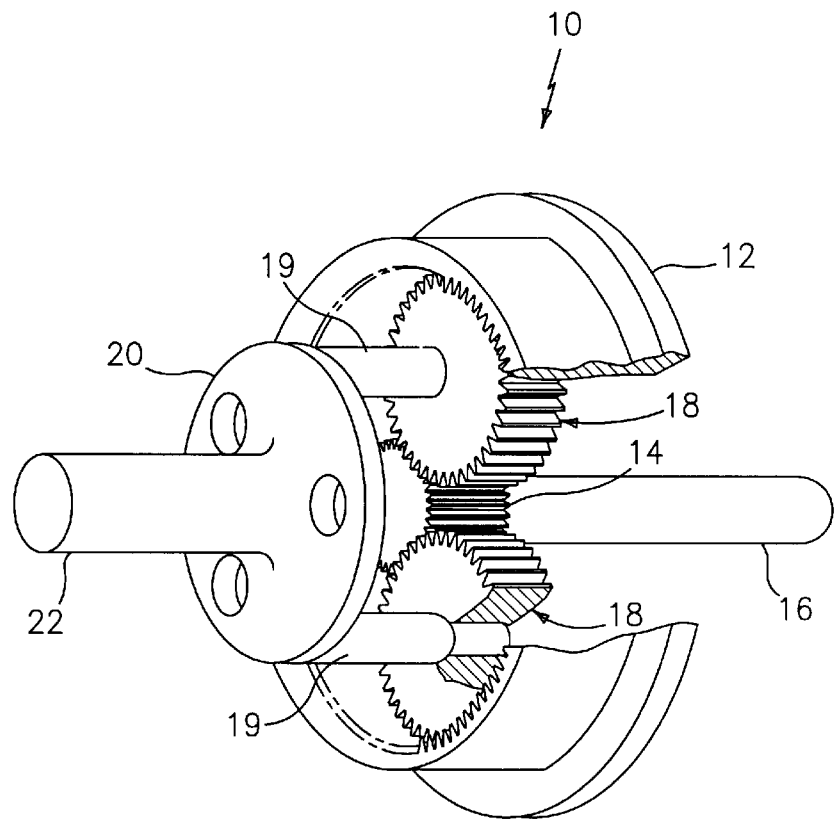
FIG. 1 is a perspective partially cutaway view of a planetary gear system.

Referring to FIG. 1, a planetary gear system is shown generally at 10. Planetary gear system 10 reduces the speed of an input shaft and multiplies its torque. Applications in which planetary gear system 10 may be incorporated include, but are not limited to, various automotive steering and drive systems, aircraft and marine drive systems, and turbine engine reduction gear systems. In particular, planetary gear system 10 may be part of a rear electric steering mechanism for a motor vehicle.

Planetary gear system 10 comprises a ring gear 12, a sun gear 14 rotatably positioned within ring gear 12 and driven by an input shaft 16, and a plurality of planet gears, two of which are shown generally at 18. Planet gears 18 are configured to be in meshed engagement simultaneously with an outer toothed surface of sun gear 14 and an inner toothed surface of ring gear 12. Each planet gear 18 is axially and rotatably positioned on a dowel pin 19 mounted to a planet carrier 20. In one embodiment, each planet gear 18 rotates perimetrically about sun gear 14 and within ring gear 12 to simultaneously apply a load to planet carrier 20, which rotates to apply a torque to an output shaft 22 depending from planet carrier 20. In another embodiment (not shown), planet gears rotate on a planet carrier, which remains fixed relative to a sun gear, to apply a load to a ring gear. The ring gear then rotates to apply a torque to an output shaft (not shown) depending from the ring gear. Although planet gear 18 is applicable to either embodiment, only the configuration in which the output shaft depends from the planet carrier is described herein.

Figure 2:
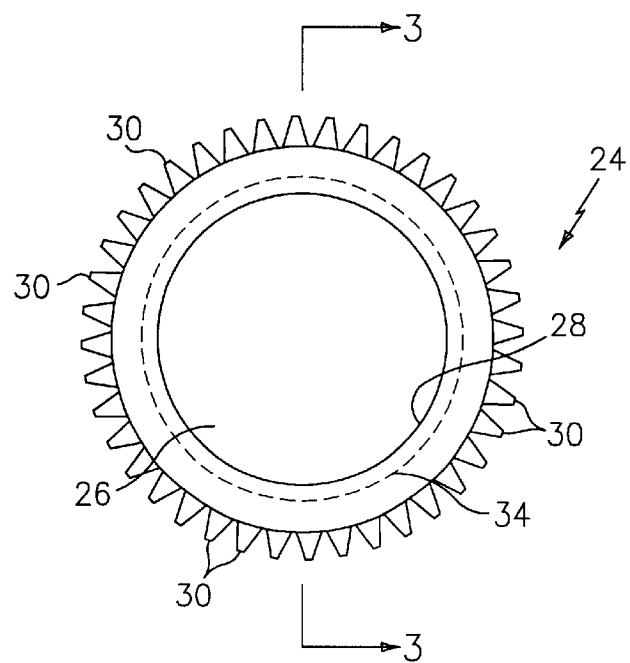
FIG. 2 is an elevation view of a face of a toothed portion of a planet gear.
Figure 3:
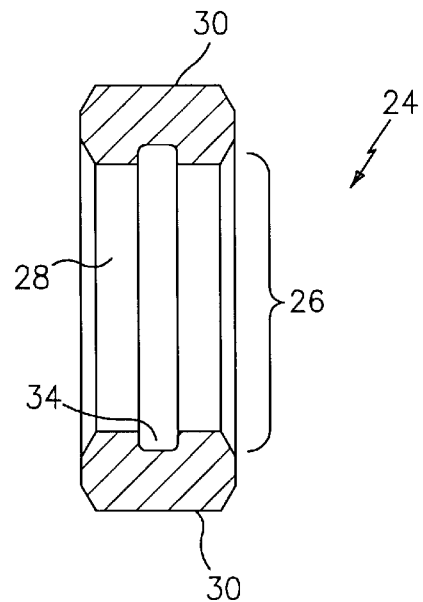
FIG. 3 is a cross-sectional view of the toothed portion of the planet gear of FIG. 2 taken along section line 3—3.

Planet gear 18 comprises a toothed portion, a hub, and an elastomeric isolator disposed therebetween to provide damping during the operation of planetary gear system 10 in which planet gear 18 is incorporated. Referring now to FIGS. 2 and 3, toothed portion, shown generally at 24, is illustrated in detail. Toothed portion 24 comprises an axial bore 26 defined by an inner surface 28 extending axially through the geometric center of toothed portion 24. Although a preferred embodiment is shown with an axial bore that is cylindrical, axial bore 26 may be any shape (e.g., triangular, square, etc.). In addition, it may be a partial cavity, or the like, not extending therethrough. Gear teeth 30 extend radially outward from an outer surface of the body of toothed portion 24. Teeth 30 are configured and dimensioned to engage the teeth of both the sun gear and the ring gear and to effectuate the movement of the planet carrier during operation of the planet gear system. A first continuous groove 34 is optionally formed circumferentially within inner surface 28 and extends around inner surface 28. A ridge or a plurality of holes (not shown) is optionally included instead of the groove 34 circumferentially within inner surface 28 extending around inner surface 28. It should be noted and appreciated that toothed portion 24 preferably includes a chamfer at an opening to axial bore 26 for facilitating assembly of the elastomeric element to the toothed portion 24.

Figure 4:
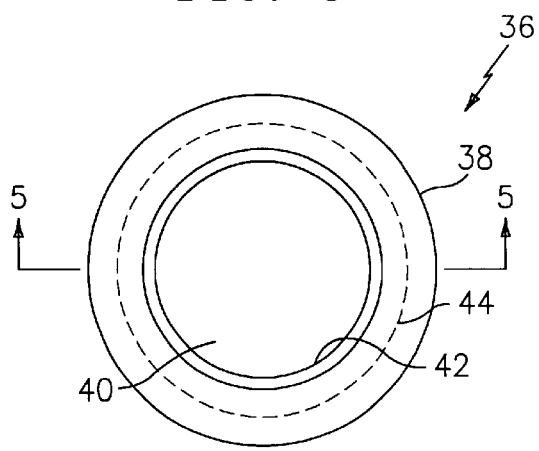
FIG. 4 is an elevation view of a face of a hub of a planet gear.
Figure 5:
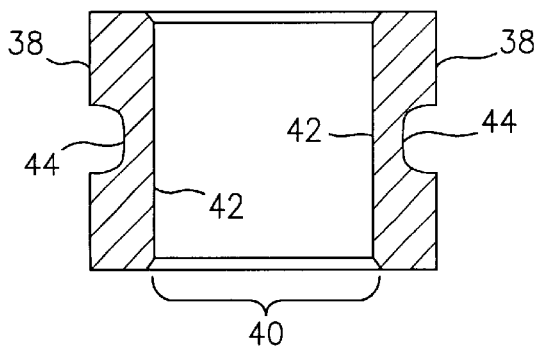
FIG. 5 is a cross-sectional view of the hub of the planet gear of FIG. 4 taken along section line 5—5.
Figure 10:
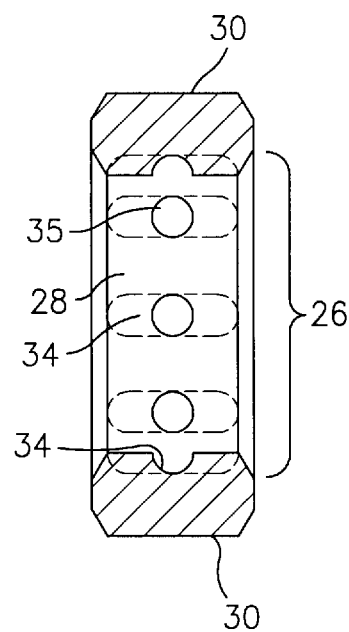
FIG. 10 is a cross-sectional view of an alternative embodiment of a toothed portion of the planet gear shown in FIG. 3.
Figure 11:
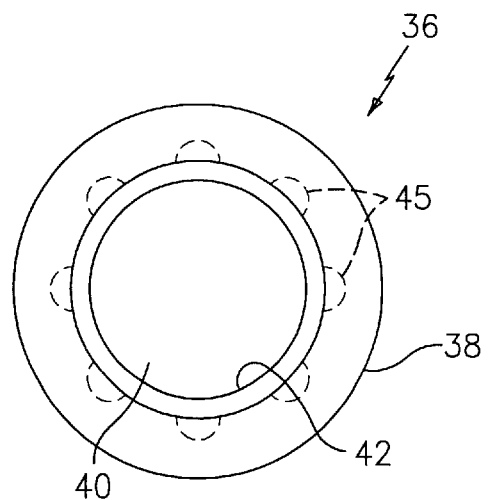
FIG. 11 is an elevation view of an alternative embodiment of a face of a hub shown in FIG. 4.

Referring now to FIGS. 4 and 5, hub 36 preferably comprises a cylindrical element having a peripheral surface 38 and a bore 40 defined by an inner surface 42 extending axially therethrough. Hub 36 is not necessarily cylindrical, but is coaxially orientable within axial bore 26 of toothed portion 24 and may be any shape, as with axial bore 26. Bore 40 is preferably chamfered at its opposing ends in order to facilitate the rotatable mounting of the planet gear on the dowel pin on the planet carrier. Bore 40 is optionally defined by an inner surface 42 that extends only partially into the hub 36 and does not extend therethrough. The perimetrical dimensions of hub 36 are less than a diameter of the bore 26 extending through the geometric center of the toothed portion 24. A second continuous groove 44 is optionally formed circumferentially within peripheral surface 38 and extends around hub 36. FIGS. 10 and 11 illustrate alternative embodiments showing a plurality of ridges or a plurality of holes 45, depicted by phantom lines in FIG. 11 that are optionally included instead of the groove 44 circumferentially disposed within peripheral surface 38 and extend around hub 36. FIG. 10 illustrates utilization of holes 35 or ridges (phantom lines around holes 35) instead of groove 34. If a first continuous groove 34, ridge (phantom lines in FIG. 10) or holes 35 are utilized, a second continuous groove 44, ridge or holes 45 are preferably axially located to correspond and align with the axial location of the first continuous groove or other corresponding respective ridge or hole when hub 36 and toothed portion 24 are assembled.

Figure 6:
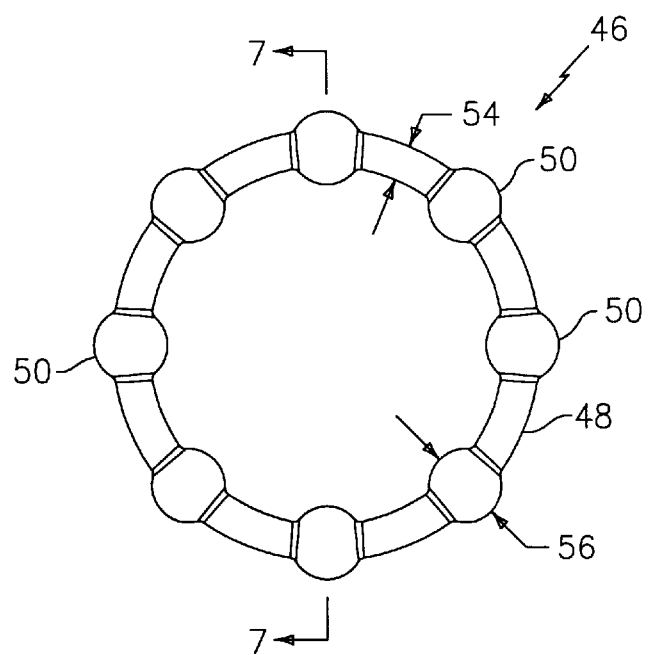
FIG. 6 is an elevation view of an elastomeric isolator.
Figure 7:
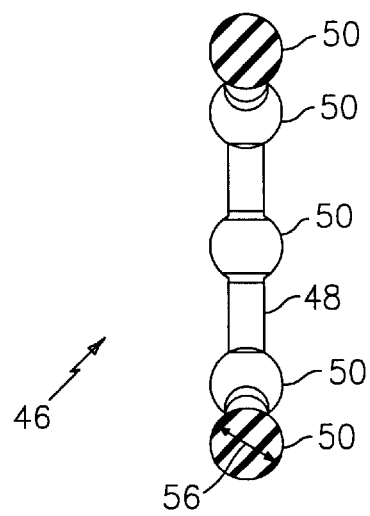
FIG. 7 is a cross-sectional view of the elastomeric isolator taken along section line 7—7 in FIG. 6.

Referring now to FIGS. 6 and 7, a preferred embodiment of an elastomeric isolator 46 is illustrated. Elastomeric isolator 46 is shown substantially circular in shape as in a typical O-ring, but optionally includes any shape configured for use with hub 36 and toothed portion 24. Elastomeric isolator 46 includes a ring 48 having a first dimension 54 and a plurality of spheroids 50 having a second dimension 56 and preferably equally spaced from each contiguous spheroid disposed around ring 48. First dimension 54 of ring 48 is a diameter of a cross section of the ring 48. Second dimension 56 of spheroids 50 is a diameter a spheroids 50. The spheroid have a larger cross-sectional diameter than the cross-sectional diameter of the ring 48 such that the spheroids 50 undergo more compression than ring 48 when coaxially assembling the hub 36 into toothed portion 24. Spheroids 50 optionally include any shape that maintains a second dimension larger than the first dimension. In a preferred embodiment depicted in FIGS. 6 and 7, the first dimension 54 of ring 48 has a cross section diameter of about 0.070" and includes eight spheroids 50 preferably equally spaced from each contiguous spheroid and having the second dimension 56 cross sectional diameter 56 of about 0.139". The elastomeric isolator 46 provides torsional retention of the toothed portion on the hub. The spheroids 50 axially retain hub 36 in relation to the toothed portion 24. Ring 48 spaces and retains the spheroids 50 from acting like rolling elements. It will be noted that a preferred embodiment herein disclosed puts less material under compression, thus allowing a lower effective spring rate to isolate gear mesh energy received by the hub 36. Specifically, the ring 48 is under no compression compared with the spheroids 50 that are preloaded within the grooves 34, 44 and provide a substantial portion of the axial and torsional retention (provided by friction between the spheroids 50 and the grooves 34, 44) of the toothed portion 24 on the hub 36, thereby operably retaining the toothed portion 24 and the hub 36 together. The elastomeric isolator 46 is assembled to the hub 36 and toothed portion 24 as with typical O-rings, wherein the isolator 46 is captured within the groove 44 on hub 36 and compressed a predetermined amount (sufficient to avoid hub-to-toothed portion contact under expected load conditions) in the assembled state of the planet gear. The dimensions, as well as the stiffness rate of the elastomeric isolator 46 are selected to provide for a clearance sufficient to allow radial excursion of the toothed portion 24 relative to the hub 36 while also avoiding hub-to-toothed portion contact under expected load conditions. The material used in manufacturing an elastomeric isolator is optionally available in a variety of durometers in order to tune the stiffness and damping to meet the system requirements.

Figure 8:
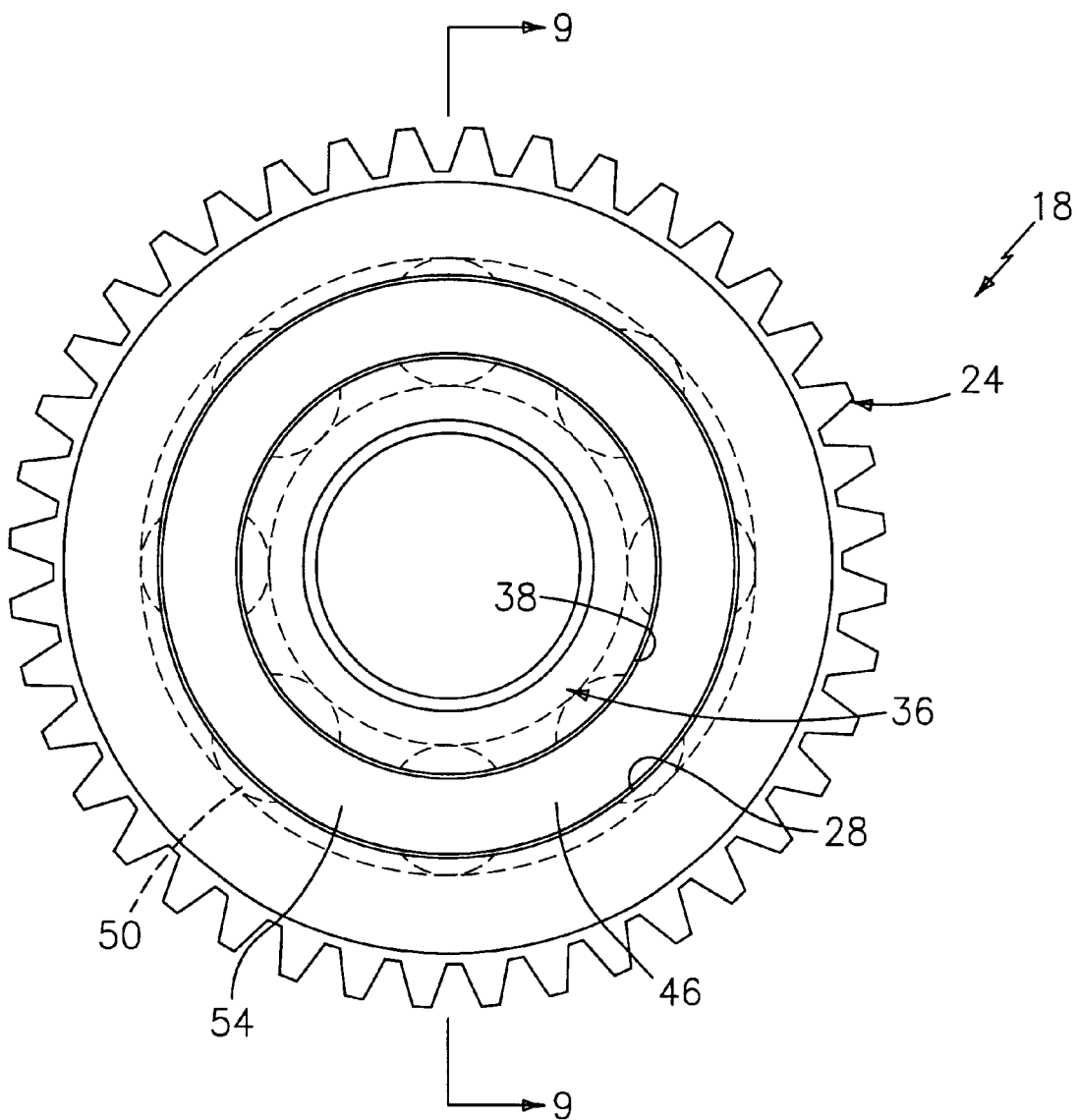
FIG. 8 is an elevation view of a planet gear having an elastomeric isolator disposed therein.
Figure 9:
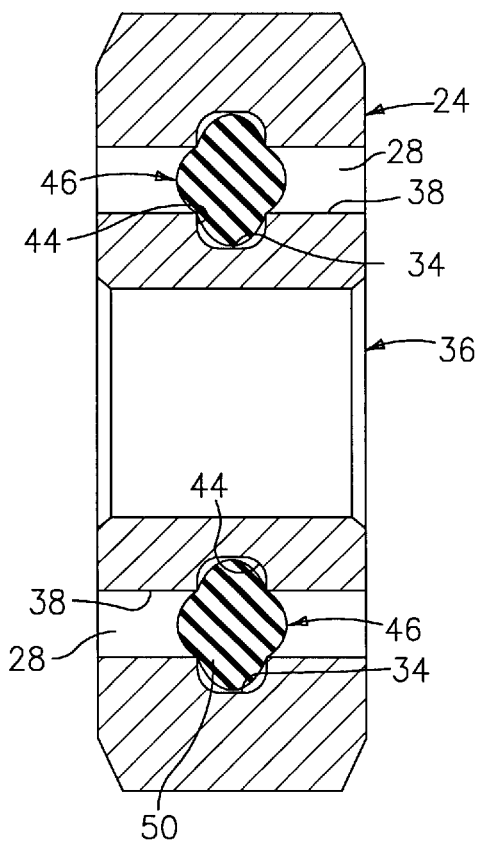
FIG. 9 is a cross-sectional view of the planet gear of FIG. 8 taken along section line 9—9.

Referring now to FIGS. 8 and 9, the assembled planet gear 18 is illustrated. The coaxial assembly of toothed portion 24 and hub 36 substantially defines an annulus between peripheral surface 38 of hub 36 and inner surface 28 of toothed portion 24 in which an elastomeric isolator 46 is accommodated. The annulus is optionally further defined by either or both first and second grooves 34, 44, as can be seen in FIG. 9, which are each of a rectangular cross sectional shape or a similar geometry utilizing grooves 34, 44. Other geometries in which first and second grooves 34, 44 can be configured include, but are not limited to, semi-circular, triangular, or trapezoidal cross sectional shapes, and like-shape variations.

First and second grooves 34, 44 are dimensioned to provide a gap that is defined by a space between exterior surfaces of grooves 34, 44 that provide improved retention of hub 36 within toothed portion 24 when planet gear 18 is properly assembled and also act as a vibration propagation barrier for the planet gear. In particular, when an elastomer is disposed within the annulus and configured to form elastomeric isolator 46, hub 36 is secured into place within tooth portion 24 and is prevented from axial movement relative to tooth portion 24. By selecting an elastomeric material that has known resiliency, hardness, and tear properties, the amount of force required to cause planet gear 18 to fail can be predetermined for a specific application.

Elastomeric isolator 46 is disposed in the annulus formed by the coaxial assembly of hub 36 within toothed portion 24 to effectuate a damping relationship between toothed portion 24 and hub 36. In a preferred embodiment, the annulus depicted in FIG. 9 is defined as having a cross-shaped cross section. Such a shape maximizes the surface area over which elastomeric isolator 46 engages toothed portion 24 and hub 36, thereby enabling elastomeric isolator 46 to provide improved axial retention of hub 36 within toothed portion 24. Such a configuration may provide for the torsional retention of hub 36 within toothed portion 24 by providing friction between peripheral surface 38 of hub 36 and the plurality of spheroids 50 of elastomeric isolator 46 and between the spheroids 50 and inner surface 28 of toothed portion 24, whereby the friction is greater at spheroids since the spheroids are under more compression than the ring 48 because of the larger size of the spheroids 50. FIG. 9 also depicts the deformation of spheroids 50 as they are compressed in the annulus defined by a generally cross-shaped cross section to which the spheroids 50 conform to a similar shape under compression and loose their radial compliancy, and hence, increasing the spring rate. The compression of the spheroids 50 preloads that portion of the elastomer and increases the spring rate of the spheroids. The spring rate defines how much force is required to get the elastomer to move. Preloading the elastomer (with compression) increases its spring rate and effectively reduces its compliancy. However, the smaller cross sectional diameter of the ring section (not shown) of isolator 46 is not compressed and ring 48 retains its radial compliancy, and thereby retaining an effective spring rate, due to its smaller size to help reduce gear mesh energy from propagating to the hub 36.

Elastomers used in the formation of elastomeric isolator 46 include, but are not limited to, thermoset rubbers such as nitrile rubber, natural rubber, polychloroprene rubber, and silicone rubber. The elastomer of choice is determined by the properties of the elastomer, the particular application, and the likelihood that the elastomer will withstand the environmental conditions that the elastomer in the planet gear is subjected to. In addition to thermoset rubbers, various types of thermoplastic materials may be used to form elastomeric isolator 46. Thermoplastic materials exhibit rubber-like characteristics but can be processed like plastic.

Regardless of the structural configuration of the radially compliant planet gear, one of the benefits occasioned by the use of an elastomeric isolator described herein in the space formed between the toothed portion and the hub is that familiarity and quality of available elastomers aids in consistent dimensional properties for such a composite planet gear. In the event that an isolator rolls or twists during assembly, the dimensional interface remains unchanged, because of part symmetry through the circular centerline. Furthermore, mechanical disposition of a pre-formed elastomeric isolator into the planet gear assembly with utilization of typical O-ring material, offers a cost advantage in tooling and piece price.

Another benefit occasioned by the use of a single elastomeric isolator in the space between the hub and the toothed portion is that in the event of a manufacturing oversight that results in the omission of the elastomeric isolator, the condition is immediately discovered. Because the elastomeric isolator provides support for the assembly of the hub within the toothed portion, the absence of the elastomeric isolator causes the planet gear to fall apart. Such a condition is extremely noticeable during manufacturing procedures. By immediately discovering the absence of the elastomeric isolator, the cause of the defective planet gear can be corrected, thereby preventing the release of an incomplete final product.

While preferred embodiments have been shown and described, various modifications and substitutions may be made thereto without departing from the spirit and scope of the invention. Accordingly, it should be understood that the present invention has been described by way of illustration only, and such illustrations and embodiments as have been disclosed herein are not to be construed as limiting to the claims.

What is claimed is:

1. A gear, comprising:
   a toothed portion having an axial bore;
   a hub disposed within said axial bore, said hub being positioned within said axial bore to define a space between said hub and said toothed portion; and
   an elastomeric isolator disposed in said space to provide a damping relationship between said toothed portion and said hub, wherein said elastomeric isolator includes a ring having a first dimension and a plurality of spheroids having a second dimension disposed on said ring.

2. The gear of claim 1 wherein each of said plurality of spheroids is equally distant to each contiguous spheroid.

3. The gear of claim 1 wherein said first dimension is less than said second dimension.

4. The gear of claim 3 wherein said first dimension is a diameter of a cross section of said ring and said second dimension is a diameter of said spheroid.

5. The gear of claim 1 wherein said toothed portion includes a first groove circumferentially disposed in an inner surface thereof, said first groove providing a surface upon which said elastomer isolator is retained.

6. The gear of claim 1 wherein said hub includes a second groove circumferentially disposed in a peripheral surface thereof, said second groove providing a surface upon which said elastomer isolator is retained.

7. The gear of claim 1 wherein said toothed portion includes a first groove circumferentially disposed in an inner surface thereof and wherein said hub includes a second groove circumferentially disposed in an peripheral surface thereof, said first groove and said second groove providing surfaces upon which said elastomer isolator is retained.

8. The gear of claim 1 wherein said toothed portion includes a plurality of holes circumferentially disposed in an inner surface thereof, said plurality of holes providing a surface upon which said plurality of spheroids are retained.

9. The gear of claim 1 wherein said hub includes a plurality of holes circumferentially disposed in a peripheral surface thereof, said plurality of holes providing a surface upon which said plurality of spheroids are retained.

10. The gear of claim 1 wherein said toothed portion includes a first plurality of holes circumferentially disposed in an inner surface thereof and wherein said hub includes a second plurality of holes aligned with said first plurality of holes circumferentially disposed in a peripheral surface thereof, said first plurality of holes and said second plurality of holes providing surfaces upon which said plurality of spheroids are retained.

11. The gear of claim 1 wherein said elastomer isolator comprises a thermoset material.

12. The gear of claim 11 wherein said thermoset material is selected from the group consisting of nitrile rubber, hydrogenated nitrile rubber, natural rubber, chloroprene rubber, polychloroprene rubber, and silicone rubber.

13. The gear of claim 1 wherein said elastomer comprises a thermoplastic material.

14. A gear, comprising:
    a toothed portion laving aln axial bore;
    a hub disposed within said axial bore, said hub being positioned within said axial bore to define a space between said hub and said toothed portion;
    an elastomeric isolator disposes in said space to provide a damping relationship between said toothed portion and said hub, wherein said elastomeric isolator includes a ring having a first dimension and a plurality of spheroids having a second dimension disposed at said ring, and
    wherein said first dimension is less than said second dimension.

15. The gear of claim 14 wherein each of said plurality of spheroids is equally distant to each contiguous spheroid.

16. The gear of claim 14 wherein said first dimension is a diameter of a cross section of said ring and said second dimension is a diameter of said spheroid.

17. The gear of claim 14 wherein said toothed portion includes a first groove circumferentially disposed in an inner surface thereof, said first groove providing a surface upon which said elasomer isolator is retained.

18. The gear of claim 14 wherein said hub includes a second groove circumferentially disposed in a peripheral surface thereof, said second groove providing a surface upon which said elastomer isolator is retained.

19. The gear of claim 14 wherein said toothed portion includes a first groove circumferentially disposed in an inner surface thereof and wherein said hub includes a second groove circumferentially disposed in a peripheral surface thereof, said first groove and said second groove providing surfaces upon which said elastomer isolator is retained.

20. The gear of claim 14 wherein said toothed portion includes a plurality of holes circumferentially disposed in an inner surface thereof, said plurality of holes providing a surface upon which said plurality of spheroids are retained.

21. The gear of claim 14 wherein said hub includes a plurality of holes circumferentially disposed in a peripheral surface thereof, said plurality of holes providing a surface upon which said plurality of spheroids are retained.

22. The gear of claim 14 wherein said toothed portion includes a first plurality of holes circumferentially disposed in an inner surface thereof and wherein said hub includes a second plurality of holes aligned with said first plurality of holes circumferentially disposed in a peripheral surface thereof, said first plurality of holes and said second plurality of holes providing surfaces upon which said plurality of spheroids are retained.

23. The gear of claim 14 wherein said elastomer isolator comprises a thermoset material.

24. The gear of claim 23 wherein said thermoset material is selected from the group consisting of nitrile rubber, hydrogenated nitrile rubber, natural rubber; chloroprene rubber, polychloroprene rubber, and silicone rubber.

25. The gear of claim 14 wherein said elastomer comprises a thermoplastic material.

* * * * *